US012680936B2

(12) United States Patent
Fan et al.

(10) Patent No.: US 12,680,936 B2
(45) Date of Patent: Jul. 14, 2026

(54) METHOD OF UTILIZING OPTICAL PATH DIFFERENCE IN TWO-PHASE FLOW FOR ANALYTICAL CALCULATION OF PARTICLE SIZE GRADATION AND SOLID CONTENT

(71) Applicant: Dandong Bettersize Instruments Ltd., Dandong City (CN)

(72) Inventors: Jilai Fan, Dandong (CN); Chuang Li, Dandong (CN); Xiaoxu Li, Dandong (CN); Hao Chen, Dandong (CN); Sen Hu, Dandong (CN); Mingfeng Wu, Dandong (CN); Xiaodong Zhou, Dandong (CN)

( * ) Notice: Subject to any disclaimer, the term of this patent is extended or adjusted under 35 U.S.C. 154(b) by 269 days.

(21) Appl. No.: 18/575,245

(22) PCT Filed: Mar. 22, 2023

(86) PCT No.: PCT/CN2023/083037
§ 371 (c)(1),
(2) Date: Dec. 28, 2023

(87) PCT Pub. No.: WO2024/183098
PCT Pub. Date: Sep. 12, 2024

(65) Prior Publication Data
US 2025/0076173 A1     Mar. 6, 2025

(30) Foreign Application Priority Data
Mar. 9, 2023    (CN) .......................... 202310226531.1

(51) Int. Cl.
*G01N 15/0205* (2024.01)
*G01N 15/00* (2006.01)

(52) U.S. Cl.
CPC . *G01N 15/0211* (2013.01); *G01N 2015/0053* (2013.01)

(58) Field of Classification Search
CPC ....... G01N 15/0211; G01N 2015/0053; G01N 15/0205; G01N 15/06; G01N 21/49; G01N 15/075; Y02A 90/10
See application file for complete search history.

(56) References Cited

U.S. PATENT DOCUMENTS 6,587,206 B1 * 7/2003 Dogariu ................. G01N 15/04
                                                        356/479

* cited by examiner

*Primary Examiner* — Rebecca C Bryant
(74) *Attorney, Agent, or Firm* — Novoclaims Patent Services LLC; Mei Lin Wong

(57) ABSTRACT

A method utilizing optical path difference in two-phase flow for analytical calculation of particle size gradation and solid content comprises: changing a width of measurement area of a laser particle size analyzer, and collecting extinction values at two different optical path lengths and a scattered light intensity signal on each detector during monitoring; utilizing the scattered light intensity signal with a long optical path to subtract the scattered light intensity signal with a short optical path on each detector to obtain a set of new scattered light intensity signals with background subtracted; processing particle size distribution inversion calculations for the set of scattered light intensity signals with background subtracted to obtain gradation data of solid particles; processing subtraction of the logarithm of the extinction value of the short optical path from the logarithm of the extinction value of the long optical path to obtain new extinction value; calculating the solid content based on the new extinction value related data and the gradation data obtained. Neither the measured scattered light intensity signal of particle gradation nor the extinction value signal of measured solid content is affected by window lens contamination. A pure scattered light intensity signal can be obtained without measuring the background signal in the pure medium state. The long-term real-time underwater or atmospheric monitoring is realized.

9 Claims, 2 Drawing Sheets

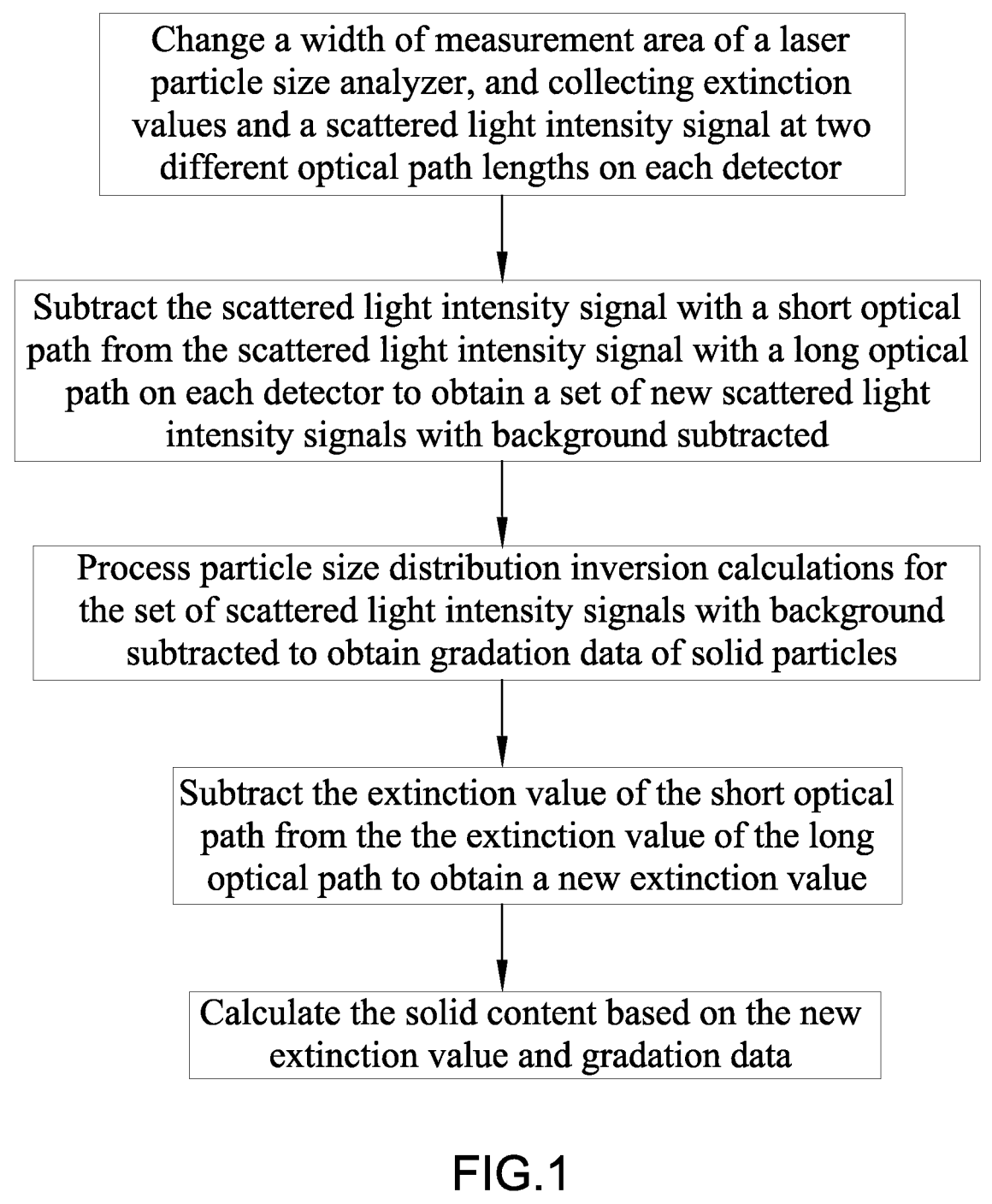

Change a width of measurement area of a laser
particle size analyzer, and collecting extinction
values and a scattered light intensity signal at two
different optical path lengths on each detector Subtract the scattered light intensity signal with a short optical
path from the scattered light intensity signal with a long optical
path on each detector to obtain a set of new scattered light
intensity signals with background subtracted Process particle size distribution inversion calculations for
the set of scattered light intensity signals with background
subtracted to obtain gradation data of solid particles Subtract the extinction value of the short optical
path from the the extinction value of the long
optical path to obtain a new extinction value Calculate the solid content based on the new
extinction value and gradation data

FIG.1

METHOD OF UTILIZING OPTICAL PATH DIFFERENCE IN TWO-PHASE FLOW FOR ANALYTICAL CALCULATION OF PARTICLE SIZE GRADATION AND SOLID CONTENT

FIELD OF INVENTION

The present invention relates to the field of underwater sand content and particle size grading monitoring, and is related to a method of utilizing optical path difference in two-phase flow for analytical calculation of particle size gradation and solid content.

DESCRIPTION OF RELATED ARTS

In hydrological monitoring work, the particle gradation and sand content analysis of sediment in rivers, oceans, and ports is an important task, which is of great significance for preventing soil erosion, sand discharge and siltation prevention in dam maintenance, and river and waterway regulation and dredging.

Sediment in rivers belongs to two-phase flow of liquid-solid. From the measurement process and application, there are two aspects in the current underwater online laser particle size analyzer, the sand content and particle size gradation monitoring instrument where there are drawbacks that affect the actual application effect. First, because river water is not a pure medium environment, the background signal of the instrument cannot be measured in real time but a fixed background signal is used as a penalty, which will have a certain impact on collecting the actual scattering signal of sediment. Second, contamination will occur if the test window lens is immersed in water for a long time, and there will be certain errors in the measured extinction value and scattering signal, which will affect the accuracy of the calculation results of particle size gradation and solid content.

Particulate matter in the air also belongs to two-phase flow of gas-solid, and its quality monitoring also has the same drawbacks as two-phase flow of liquid-solid monitoring. Therefore, there is an urgent need for a method with higher accuracy and more convenient to use to improve the monitoring accuracy of particle size gradation and solid content in two-phase flow.

SUMMARY OF THE PRESENT INVENTION

An object of the present invention is to provide a method utilizing optical path difference in two-phase flow for analytical calculation of particle size gradation and solid content to solve the problem of errors in the calculation of particle size gradation and solid content caused by the use of fixed background signals and contamination of the test window lens (of the laser particle size analyzer).

According to the present invention, a method utilizing optical path difference in two-phase flow for analytical calculation of particle size gradation and solid content comprises the following steps:

Step 1: Changing a width of measurement area of a laser particle size analyzer, and collecting extinction values at two different optical path lengths and a scattered light intensity signal on each detector during monitoring;

Step 2: the scattered light intensity signal with a short optical path is subtracted from the scattered light intensity signal with a long optical path on each detector to obtain a set of new scattered light intensity signals with background subtracted;

Step 3: processing particle size distribution inversion calculations for the set of scattered light intensity signals with background subtracted to obtain gradation data of solid particles;

Step 4: Processing subtraction of the logarithm of the extinction value of the short optical path from the logarithm of the extinction value of the long optical path to obtain new extinction value related data;

Step 5: Processing calculation of the solid content based on the new extinction value related data and the gradation data obtained from the above steps.

According to the method utilizing optical path difference in two-phase flow for analytical calculation of particle size gradation and solid content of the present invention, in step 2, the new scattered light intensity signals on the detector is calculated by the followings:

$$S = A_1 - A_2 = (S_1 + B) - (S_2 + B) = S_1 - S_2$$

wherein $A_1$ refers to a scattered light intensity signal with long optical path and background on the detector, $A_2$ refers to a scattered light intensity signal with short optical path and background on the detector, B refers to the background signal, $S_1$ refers to a scattered light intensity signal with long optical path after the background is subtracted, $S_2$ refers to a scattered light intensity signal with short optical path after the background is subtracted, S refers to a scattered light intensity signal difference for scattered light intensity signal with different optical paths, that is, the new scattered light intensity signal; the new scattered light intensity signal on each detector constitutes a new set of scattered light intensity signals.

According to the method utilizing optical path difference in two-phase flow for analytical calculation of particle size gradation and solid content of the present invention, in step 4, the specific calculation of the new extinction value is:

$$\ln\left(\frac{I_1}{I_0}\right) = -\frac{3C_vL_1K_{ext}}{2D}$$

$$\ln\left(\frac{I_2}{I_0}\right) = -\frac{3C_vL_2K_{ext}}{2D}$$

$$\ln\left(\frac{I_1}{I_0}\right) - \ln\left(\frac{I_2}{I_0}\right) = -\frac{3C_vL_1K_{ext}}{2D} + \frac{3C_vL_2K_{ext}}{2D} = -\frac{3C_vK_{ext}}{2D}(L_1 - L_2)$$

Wherein $I_1$ refers to transmitted signal for long optical path, $I_2$ refers to transmitted signal for short optical path, $I_0$ refers to the initial light intensity signal, D refers to the surface area mean diameter of the solid particles calculated by the scattered light intensity inversion in step 3, and Kext refers to the extinction coefficient, $L_1$ refers to a length of the long optical path, $L_2$ refers to a length of the short optical path, Cv refers to a volume concentration of solid particles.

According to the method utilizing optical path difference in two-phase flow for analytical calculation of particle size gradation and solid content of the present invention, in step 5, the solid content H is calculated according to the following formula:

$$H = C_v \times \rho = -\frac{\left[\ln\left(\frac{I_1}{I_0}\right) - \ln\left(\frac{I_2}{I_0}\right)\right] 2D}{3K_{ext}(L_1 - L_2)} \times \rho$$

Wherein $\rho$ refers to a density of solid particle.

The method utilizing optical path difference in two-phase flow for analytical calculation of particle size gradation and solid content at least has the following advantageous effect:

The scattered signals with long optical path and short optical path are both scattered signals with background. When they are compared, it is equivalent to subtracting the background from the two scattered signals with background. The remaining signal is the difference in intensity of the scattered signal, which is also the scattered signal of the group of particles in the two-phase flow system and completely contains the particle size distribution information. If the window lens (of the laser particle size analyzer) is contaminated, then the scattered signal generated by the contaminant is in the background and can be completely subtracted. The resulting scattered signal is the true scattered signal of the sediment in the two-phase flow. The extinction value is also measured by subtracting the extinction value under the short optical path from the extinction value under the long optical path. In this way, due to the contamination of the window lens (of the laser particle size analyzer), the part of the extinction value that is not caused by sediment particles will be subtracted, and the extinction value will not be affected by the contamination of window lenses.

The present invention is not affected by window lens contamination (of the laser particle size analyzer), whether it is the measured the scattered light intensity signal of particle gradation or the extinction value signal of measured solid content, and can obtain simple and pure scattered light intensity signal without the step of measuring the background signal in pure medium, thereby realizing a long-term operation of underwater or atmospheric online monitoring (through the laser particle size analyzer).

BRIEF DESCRIPTION OF THE DRAWINGS

FIG. 1 is a flowchart of method utilizing optical path difference in two-phase flow for analytical calculation of particle size gradation and solid content according to the present invention.

DETAILED DESCRIPTION OF THE PREFERRED EMBODIMENT

Figure 2:
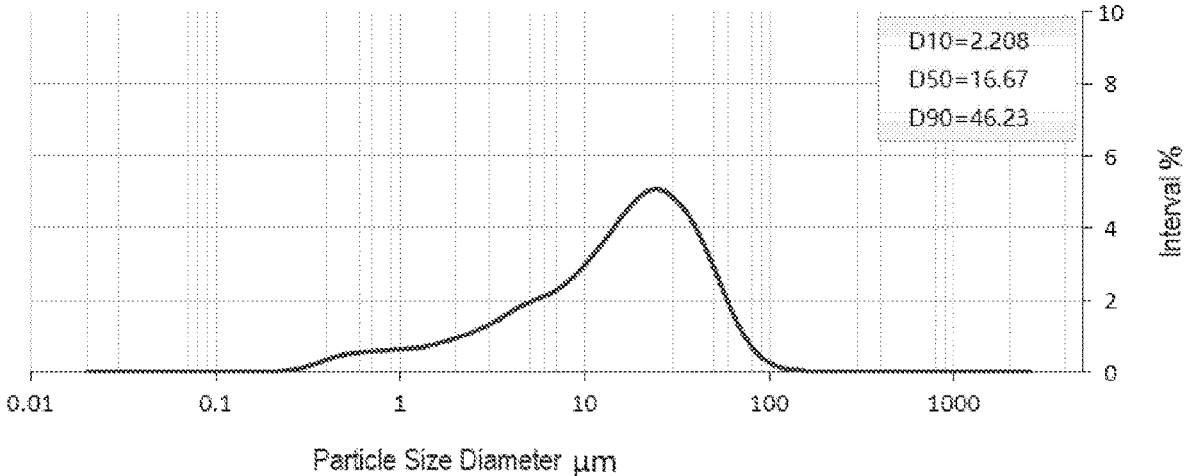
FIG. 2 is a particle size distribution diagram obtained based on Mie scattering theory.

Referring to FIG. 1, a method utilizing optical path difference in two-phase flow for analytical calculation of particle size gradation and solid content according to the present invention comprises the following steps:

Step 1: The width of measurement area of a laser particle size analyzer is changed. During monitoring, the extinction values at two different optical path lengths and a scattered light intensity signal on each detector are collected.

According to this embodiment, as shown in Table 1, the collected scattered light intensity distributions at two different optical path lengths are as follows

| Length of Measurement Area: 2 mm Optical Path Measured Extinction Value $\ln(I_2/I0) = -0.0943$ The Scattered Light Intensity of each Detector is as follows: | Length of Measurement Area: 3 mm Optical Path Measured Extinction Value $\ln(I_1/I0) = -0.287$ The Scattered Light Intensity of each Detector is as follows: | Difference Calculation Extinction Value Difference=— Difference between the Scattered Signals of each Detector is as |
|---|---|---|
| 5167.23 | 3588.963 | −1578.267 |
| 3956.379 | 3260.721 | −695.658 |
| 1534.273 | 1364.772 | −169.501 |
| 1001.801 | 909.718 | −92.083 |
| 548.776 | 513.048 | −35.728 |
| 490.915 | 450.363 | −40.552 |
| 354.166 | 331.968 | −22.198 |
| 333.446 | 309.917 | −23.529 |
| 280.98 | 266.197 | −14.783 |
| 270.817 | 257.28 | −13.537 |
| 241.91 | 235.644 | −6.266 |
| 248.5 | 245.216 | −3.284 |
| 237.408 | 240.078 | 2.67 |
| 260.722 | 268.173 | 7.451 |
| 259.116 | 274.643 | 15.527 |
| 272.375 | 295.618 | 23.243 |
| 292.769 | 325.546 | 32.777 |
| 328.452 | 373.51 | 45.058 |
| 383.206 | 443.302 | 60.096 |
| 427.557 | 505.911 | 78.354 |
| 523.84 | 628.434 | 104.594 |
| 601.167 | 730.885 | 129.718 |
| 689.158 | 848.572 | 159.414 |
| 802.222 | 999.399 | 197.177 |
| 944.272 | 1186.075 | 241.803 |
| 1097.906 | 1391.366 | 293.46 |
| 1296.674 | 1645.303 | 348.629 |
| 1514.234 | 1932.2 | 417.966 |
| 1762.493 | 2267.687 | 505.194 |
| 2043.676 | 2647.561 | 603.885 |
| 2359.548 | 3069.963 | 710.415 |
| 2654.656 | 3463.351 | 808.695 |
| 2941.415 | 3851.256 | 909.841 |
| 3631.194 | 4604.883 | 973.689 |
| 3483.78 | 4572.389 | 1088.609 |
| 3896.296 | 5083.865 | 1187.569 |
| 4161.654 | 5492.191 | 1330.537 |
| 4535.62 | 5984.344 | 1448.724 |
| 4965.422 | 6563.453 | 1598.031 |
| 5308.882 | 7008.687 | 1699.805 |
| 5715.995 | 7537.142 | 1821.147 |
| 6192.446 | 8062.983 | 1870.537 |
| 6415.429 | 8468.343 | 2052.914 |
| 6758.973 | 8871.968 | 2112.995 |
| 7041.008 | 9275.152 | 2234.144 |
| 7321.049 | 9634.642 | 2313.593 |
| 7599.674 | 10002.993 | 2403.319 |
| 7853.106 | 10327.616 | 2474.51 |
| 8054.424 | 10594.912 | 2540.488 |
| 8361.472 | 11011.056 | 2649.584 |
| 8699.398 | 11440.092 | 2740.694 |
| 9034.359 | 11891.172 | 2856.813 |
| 9366.257 | 12313.862 | 2947.605 |
| 9786.41 | 12867.667 | 3081.257 |
| 10131.857 | 13363.827 | 3231.97 |
| 10481.914 | 13843.943 | 3362.029 |
| 10888.937 | 14362.57 | 3473.633 |
| 11217.049 | 14871.9 | 3654.851 |
| 11489.425 | 15283.211 | 3793.786 |
| 11750.904 | 15701.206 | 3950.302 |
| 12036.368 | 16150.397 | 4114.029 |
| 12305.886 | 16663.214 | 4357.328 |
| 12468.702 | 16999.625 | 4530.923 |
| 12724.211 | 17504.46 | 4780.249 |
| 12783.646 | 17725.052 | 4941.406 |
| 12938.338 | 18047.344 | 5109.006 |
| 13229.308 | 18599.631 | 5370.323 |
| 13396.673 | 18970.73 | 5574.057 |
| 13583.191 | 19354.514 | 5771.323 |
| 13830.258 | 19772.346 | 5942.088 |
| 14019.414 | 20226.03 | 6206.616 |

-continued

| Length of Measurement Area: 2 mm Optical Path Measured Extinction Value $\ln(I_2/I0) = -0.0943$ The Scattered Light Intensity of each Detector is as follows: | Length of Measurement Area: 3 mm Optical Path Measured Extinction Value $\ln(I_1/I0) = -0.287$ The Scattered Light Intensity of each Detector is as follows: | Difference Calculation Extinction Value Difference=— Difference between the Scattered Signals of each Detector is as |
|---|---|---|
| 14237.112 | 20583.46 | 6346.348 |
| 12258.941 | 17791.09 | 5532.149 |
| 11868.634 | 17245.083 | 5376.449 |
| 11496.996 | 16693.347 | 5196.351 |
| 10812.336 | 15682.237 | 4869.901 |
| 10083.973 | 14549.012 | 4465.039 |
| 9318.834 | 13421.222 | 4102.388 |
| 8500.133 | 12219.003 | 3718.87 |
| 7884.584 | 11274.975 | 3390.391 |
| 7032.316 | 10043.987 | 3011.671 |
| 6343.078 | 9034.326 | 2691.248 |
| 5460.253 | 7724.258 | 2264.005 |
| 4737.527 | 6678.556 | 1941.029 |
| 4119.438 | 5824.263 | 1704.825 |
| 3747.709 | 5303.985 | 1556.276 |
| 2893.277 | 3339.839 | 446.562 |
| 1503.234 | 1983.828 | 480.594 |
| 1137.452 | 1524.015 | 386.563 |
| 816.863 | 1115.841 | 298.978 |
| 534.471 | 737.838 | 203.367 |
| 283.284 | 385.478 | 102.194 |

Step 2: On each detector (of the laser particle size analyzer), subtracts the scattered light intensity signal with a short optical path from the scattered light intensity signals with a long optical path to obtain a set of new scattered light intensity signals with background being subtracted.

In specific implementation, the calculation process of the new scattered light intensity signal in step 2 is as follows:

$$S = A_1 - A_2 = (S_1 + B) - (S_2 + B) = S_1 - S_2$$

wherein $A_1$ refers to a scattered light intensity signal with long optical path and background, $A_2$ refers to a scattered light intensity signal with short optical path and background, B refers to the background signal, $S_1$ refers to a scattered light intensity signal with long optical path after the background is subtracted, $S_2$ refers to a scattered light intensity signal with short optical path after the background is subtracted, S refers to a scattered light intensity signal difference for scattered light intensity signals with different optical paths, that is, the new scattered light intensity signal.

Step 3: For the new set of scattered light intensity signals, process particle size distribution inversion calculation to obtain gradation data of solid particles.

In specific implementation, through the new set of scattered light intensity signals, the particle size distribution is obtained according to Mie scattering theory, which is shown in FIG. 2 of the drawings. The typical characteristic values are calculated, which includes grading data such as volume mean diameter, surface area mean diameter, length mean diameter, number mean diameter, peak particle size diameter, specific surface area, span, and etc. The details are shown in Table 2 as follows:

| D00 | 0.205 | μm | volume mean diameter D[4,3] | 21.15 | μm |
|---|---|---|---|---|---|

-continued

| D10 | 2.208 | μm | surface area mean diameter D[3,2] | 5.013 | μm |
|---|---|---|---|---|---|
| D16 | 3.817 | μm | length mean diameter D[2,1] | 0.936 | μm |
| D25 | 6.599 | μm | number mean diameter D[1,0] | 0.500 | μm |
| D50 | 16.67 | μm | peak particle size diameter | 24.39 | μm |
| D75 | 30.37 | μm | specific surface area | 443.2 | m²/kg |
| D84 | 38.37 | μm | Span | 2.640 | |
| D90 | 46.23 | μm | | | |
| D100 | 151.1 | μm | | | |

Step 4: Process subtraction of the logarithm of the extinction value of the short optical path from the logarithm of the extinction value of the long optical path to obtain new extinction value. In particular, the calculation of the new extinction value is as follows:

$$\ln\left(\frac{I_1}{I_0}\right) = -\frac{3C_v L_1 K_{ext}}{2D}$$

$$\ln\left(\frac{I_2}{I_0}\right) = -\frac{3C_v L_2 K_{ext}}{2D}$$

$$\ln\left(\frac{I_1}{I_0}\right) - \ln\left(\frac{I_2}{I_0}\right) = -\frac{3C_v L_1 K_{ext}}{2D} + \frac{3C_v L_2 K_{ext}}{2D} = -\frac{3C_v K_{ext}}{2D}(L_1 - L_2)$$

Wherein $I_1$ refers to transmitted signal for long optical path, $I_2$ refers to transmitted signal for short optical path, $I_0$ refers to the initial light intensity signal, D refers to the surface area mean diameter of the solid particles calculated by the scattered light intensity inversion in step 3, and Kext refers to the extinction coefficient, $L_1$ refers to a length of the long optical path, $L_2$ refers to a length of the short optical path, Cv refers to a volume concentration of solid particles.

Step 5: Process calculation of the solid content based on the new extinction value and the gradation data obtained from the above steps.

In specific implementation, the solid content H is calculated according to the following formula:

$$H = C_v \times \rho = -\frac{\left[\ln\left(\frac{I_1}{I_0}\right) - \ln\left(\frac{I_2}{I_0}\right)\right]2D}{3K_{ext}(L_1 - L_2)} \times \rho$$

Wherein ρ refers to the density of solid particles.

In the formula, the value of D is D[3,2] in the typical value of particle size distribution data, which is 5.013 μm. $K_{ext}$ is an extinction coefficient corresponding to D[3,2] 5.013 μm, based on Mie scattering calculation, it is 2.0015 . . . $L_1$=3 mm, $L_2$=2 mm, $$\frac{I_1}{I_0} = 0.75, \frac{I_2}{I_0} = 0.91.$$

The parameters are brought into the formula to calculate the Cv value, which is 0.000322. According to this embodiment, the test sample is sediment, and the density is taken as a constant of 2.4. When put into the formula, the solid content is 0.000775, usually the unit of solid content is g/L, and the solid content of this test is 0.775 g/L after unit conversion.

The present invention is a method for analyzing and calculating particle size gradation and solid content using optical path difference method in two-phase flow, which belongs to the field of underwater sand content measurement and particle size gradation.

This sand content and particle size gradation monitoring method with optical path difference collects the extinction values at two optical path lengths and the scattered light intensity signal on the detector, and subtracts the short optical path signal from the long optical path signal to obtain a new set of scattered light intensity signals and extinction values. The scattered light intensity signal is the scattering signal of the particle group in the two-phase flow system, including particle size distribution information. The sediment content can be calculated based on the scattered light intensity signal and extinction value. Whether it is the measured scattered light intensity signal of particle gradation or the extinction value signal of measured solid content, they are not affected by window lens contamination, and can realize long-term operation of underwater or atmospheric online monitoring. There is no need to measure the background signal in the pure medium state, and a pure scattered light intensity signal can be obtained.

The above description includes the preferred embodiments of the present invention only and is not intended to be limiting the concept of the present invention. Within the spirit and principle of the present invention, any modifications, equivalent substitutions, improvements, etc., shall be included in the protection scope of the present invention.

What is claimed is:

1. A method of solid content measurement utilizing optical path difference in two-phase flow, characterized in that, said method, carried out through a laser particle size analyzer comprises the following steps:

step 1: providing the laser particle size analyzer with a plurality of detectors, changing a width of measurement area of the laser particle size analyzer, and monitoring and collecting extinction values from direct source at two different optical path lengths and a scattered light intensity signal on each detector at two different optical path lengths, wherein the two different optical path lengths are defined as a long optical path length and a short optical path length, and the long optical path length is greater than the short optical path length;

step 2: utilizing the scattered light intensity signal at the long optical path length to subtract the scattered light intensity signal at the short optical path length on each detector to obtain a set of new scattered light intensity signals with background subtracted;

step 3: processing particle size distribution inversion calculations for the set of scattered light intensity signals with background subtracted to obtain gradation data of solid particles;

step 4: processing subtraction of the logarithm of the extinction value of the short optical path from the logarithm of the extinction value of the long optical path to obtain new extinction value related data;

step 5: processing calculation of the solid content based on the new extinction value related data and the gradation data obtained.

2. The method of solid content measurement utilizing optical path difference in two-phase flow according to claim 1, characterized in that: in step 2, the new scattered light intensity signals on each detector is calculated by the followings:

$$S = A_1 - A_2 = (S_1 + B) - (S_2 + B) = S_1 - S_2$$

wherein $A_1$ refers to a scattered light intensity signal with long optical path and background on the detector, $A_2$ refers to a scattered light intensity signal with short optical path and background on the detector, B refers to the background signal, $S_1$ refers to a scattered light intensity signal with long optical path after the background is subtracted, $S_2$ refers to a scattered light intensity signal with short optical path after the background is subtracted, S refers to a scattered light intensity signal difference for different optical paths, that is, the new scattered light intensity signal; the new scattered light intensity signal on each detector constitutes a new set of scattered light intensity signals.

3. The method of solid content measurement utilizing optical path difference in two-phase flow according to claim 1, characterized in that: in step 4, the new extinction value is:

$$-\frac{3C_v K_{ext}}{2D}(L_1 - L_2)$$

and a specific calculation of the new extinction value is:

$$\ln\left(\frac{I_1}{I_0}\right) = -\frac{3C_v L_1 K_{ext}}{2D}$$

$$\ln\left(\frac{I_2}{I_0}\right) = -\frac{3C_v L_2 K_{ext}}{2D}$$

$$\ln\left(\frac{I_1}{I_0}\right) - \ln\left(\frac{I_2}{I_0}\right) = -\frac{3C_v L_1 K_{ext}}{2D} + \frac{3C_v L_2 K_{ext}}{2D} = -\frac{3C_v K_{ext}}{2D}(L_1 - L_2)$$

wherein $I_1$ refers to transmitted signal for long optical path, $I_2$ refers to transmitted signal for short optical path, $I_0$ refers to the initial light intensity signal, D refers to the surface area mean diameter of the solid particles calculated by the scattered light intensity inversion in step 3, and Kext refers to the extinction coefficient, $L_1$ refers to a length of the long optical path, $L_2$ refers to a length of the short optical path, Cv refers to a volume concentration of solid particles.

4. The method of solid content measurement utilizing optical path difference in two-phase flow according to claim 3, characterized in that: in step 5, the solid content H is calculated according to the following formula:

$$H = C_v \times \rho = -\frac{\left[\ln\left(\frac{I_1}{I_0}\right) - \ln\left(\frac{I_2}{I_0}\right)\right]2D}{3K_{ext}(L_1 - L_2)} \times \rho$$

wherein $\rho$ refers to a density of solid particle.

5. The method of solid content measurement utilizing optical path difference in two-phase flow according to claim 2, characterized in that: in step 4, the new extinction value is:

$$-\frac{3C_v K_{ext}}{2D}(L_1 - L_2)$$

and a specific calculation of the new extinction value is:

$$\ln\left(\frac{I_1}{I_0}\right) = -\frac{3C_v L_1 K_{ext}}{2D}$$

$$\ln\left(\frac{I_2}{I_0}\right) = -\frac{3C_v L_2 K_{ext}}{2D}$$

$$\ln\left(\frac{I_1}{I_0}\right) - \ln\left(\frac{I_2}{I_0}\right) = -\frac{3C_v L_1 K_{ext}}{2D} + \frac{3C_v L_2 K_{ext}}{2D} = -\frac{3C_v K_{ext}}{2D}(L_1 - L_2)$$

wherein $I_1$ refers to transmitted signal for long optical path, $I_2$ refers to transmitted signal for short optical path, $I_0$ refers to the initial light intensity signal, D refers to the surface area mean diameter of the solid particles calculated by the scattered light intensity inversion in step 3, and Kext refers to the extinction coefficient, $L_1$ refers to a length of the long optical path, $L_2$ refers to a length of the short optical path, Cv refers to a volume concentration of solid particles.

6. The method of solid content measurement utilizing optical path difference in two-phase flow according to claim

5, characterized in that: in step 5, the solid content H is calculated according to the following formula:

$$H = C_v \times \rho = -\frac{\left[\ln\left(\frac{I_1}{I_0}\right) - \ln\left(\frac{I_2}{I_0}\right)\right]2D}{3K_{ext}(L_1 - L_2)} \times \rho$$

wherein $\rho$ refers to a density of solid particle.

7. The method of solid content measurement utilizing optical path difference in two-phase flow according to claim 1, wherein the processing particle size distribution inversion calculations is based on Mie scattering theory, which comprises the steps of:

calculating characteristic values comprising volume mean diameter, surface area mean diameter, length mean diameter, number mean diameter, peak particle size diameter, specific surface area, and span.

8. The method of solid content measurement utilizing optical path difference in two-phase flow according to claim 2, wherein the processing particle size distribution inversion calculations is based on Mie scattering theory, which comprises the steps of:

calculating characteristic values comprising volume mean diameter, surface area mean diameter, length mean diameter, number mean diameter, peak particle size diameter, specific surface area, and span.

9. The method of solid content measurement utilizing optical path difference in two-phase flow according to claim 6, wherein the processing particle size distribution inversion calculations is based on Mie scattering theory, which comprises the steps of:

calculating characteristic values comprising volume mean diameter, surface area mean diameter, length mean diameter, number mean diameter, peak particle size diameter, specific surface area, and span.

\* \* \* \* \*